(12) United States Patent
Nowakowski et al.

(10) Patent No.: US 10,607,416 B2
(45) Date of Patent: Mar. 31, 2020

(54) CONDITIONAL AVAILABILITY OF VEHICULAR MIXED-REALITY

(71) Applicant: Valeo Comfort and Driving Assistance, Creteil (FR)

(72) Inventors: Christopher Steven Nowakowski, San Francisco, CA (US); Siav-Kuong Kuoch, Saint Maur des fossés (FR); Alexandre Jacques Garnault, San Mateo, CA (US); Mohamed Amr Mohamed Nader Abuelfoutouh, San Mateo, CA (US)

(73) Assignee: VALEO COMFORT AND DRIVING ASSISTANCE (FR)

( * ) Notice: Subject to any disclaimer, the term of this patent is extended or adjusted under 35 U.S.C. 154(b) by 0 days.

(21) Appl. No.: 16/118,018

(22) Filed: Aug. 30, 2018

(65) Prior Publication Data
US 2020/0074735 A1 Mar. 5, 2020

(51) Int. Cl.
*G06T 19/00* (2011.01)
*B60R 1/00* (2006.01)
*G08G 1/00* (2006.01)

(52) U.S. Cl.
CPC ........... *G06T 19/006* (2013.01); *B60R 1/00* (2013.01); *G08G 1/22* (2013.01); *B60R 2300/105* (2013.01); *B60R 2300/303* (2013.01); *B60R 2300/70* (2013.01); *B60R 2300/802* (2013.01)

(58) Field of Classification Search
CPC ........... G06K 9/00805; G06K 9/3241; B60W 30/0956; G06T 19/006; G08G 1/22; B60R 1/00; B60R 2300/105; B60R 2300/70; B60R 2300/303; B60R 2300/802
See application file for complete search history.

(56) References Cited

U.S. PATENT DOCUMENTS

| | | | |
|---|---|---|---|
| 8,368,755 B2 | 2/2013 | Nishida et al. | |
| 8,412,413 B1 * | 4/2013 | Stark | G02B 27/01 340/980 |
| 8,744,666 B2 | 6/2014 | Switkes et al. | |
| 8,947,219 B2 * | 2/2015 | Popovic | B60Q 9/008 340/436 |

(Continued)

OTHER PUBLICATIONS

Isamu Takai et al., "Optical Vehicle-to-Vehicle Communication System Using LED Transmitter and Camera Receiver", IEEE Journals & Magazine, p. 1-24, Aug. 2014 (Year: 2014).*

(Continued)

*Primary Examiner* — Chante E Harrison
(74) *Attorney, Agent, or Firm* — Kilpatrick Townsend & Stockton LLP

(57) ABSTRACT

Methods, apparatuses, and computer-readable media are presented for providing a mixed-reality scene involving a lead vehicle and a following vehicle. The system may present a sequence of mixed-reality images to a driver of the following vehicle, resulting from merging (a) an image captured by a camera aboard the lead vehicle and (b) an image captured by a camera aboard the following vehicle, to generate a merged image. The system may discontinue or diminish mixed-reality content of the sequence of mixed-reality images in response to one or more detected conditions, which may comprise detection of an object between the lead vehicle and the following vehicle.

20 Claims, 10 Drawing Sheets

(56) References Cited

U.S. PATENT DOCUMENTS

| | | | |
|---|---|---|---|
| 9,043,483 | B2 | 5/2015 | Grigsby et al. |
| 9,165,198 | B2 | 10/2015 | Siegel et al. |
| 9,403,482 | B2 | 8/2016 | Shahraray et al. |
| 9,713,956 | B2* | 7/2017 | Bark ............... B60K 35/00 |
| 9,858,817 | B1* | 1/2018 | Bletzer ............ B60R 1/00 |
| 10,332,292 | B1 | 6/2019 | Arnicar |
| 2010/0253539 | A1* | 10/2010 | Seder ............... G01S 13/723 340/903 |
| 2012/0268262 | A1* | 10/2012 | Popovic ........... B60Q 9/008 340/438 |
| 2014/0063064 | A1* | 3/2014 | Seo .................. G08G 1/166 345/633 |
| 2014/0333729 | A1* | 11/2014 | Pflug ................ G06T 15/20 348/47 |
| 2016/0054735 | A1 | 2/2016 | Switkes et al. |
| 2016/0277601 | A1 | 9/2016 | Seymour |
| 2017/0200197 | A1* | 7/2017 | Brubaker .......... G09F 9/35 |
| 2018/0101736 | A1 | 4/2018 | Han et al. |
| 2018/0186290 | A1 | 7/2018 | Ward et al. |
| 2018/0236939 | A1* | 8/2018 | Smith ............... H04N 7/183 |
| 2019/0005726 | A1* | 1/2019 | Nakano ............ G06T 19/006 |
| 2019/0051030 | A1* | 2/2019 | Choi ................. B60R 1/00 |
| 2019/0052842 | A1* | 2/2019 | Du .................... B60R 1/00 |
| 2019/0088142 | A1* | 3/2019 | Kotteri ............. B60W 30/165 |

OTHER PUBLICATIONS

Broadcasting System "Transparentius", Art Lebedev Design Studio, Transport Trucks Show the Road Ahead, Available online at: https://www.artlebedev.ru/transparentius/, Dec. 21, 2009 [retrieved on Oct. 3, 2018], 3 pages.
Hawk Beacon, Wikipedia, Available online at: https://en.wikipedia.org/wiki/HAWK_beacon, Jul. 15, 2018 [retrieved on Oct. 4, 2018], 3 pages.
Neavia Unveils World's First V2X Pedestrian Warning Solution, Neavia Technologies, Available online at: http://www.neavia.com/2016-11-neavia-unveils-worlds-first-v2x-pedestrian-warning-solution/?lang=en, Oct. 27, 2016 [retrieved on Oct. 4, 2018], 3 pages.
Signalized Intersections: Informational Guide, (FHWA-HRT-04-091), Federal Highway Administration, U.S. Department of Transportation, Available online at: https://www.fhwa.dot.gov/publications/research/safety/04091/, Aug. 2004 [retrieved on Oct. 4, 2018], 18 pages.
TAPCO LaneLight In-Road Warning Lights, In Pavement LED Crosswalk Lighting Markers, TAPCO Traffic & Parking Control Co., Inc., TAPCO, Safe Travels, Available online at: https://www.tapconet.com/solar-led-division/in-road-warning-lights, Accessed from Internet on Oct. 4, 2018, 2 pages.
The Safety Truck Could Revolutionize Road Safety, Samsung Press Release, Available online at: https://news.samsung.com/global/the-safety-truck-could-revolutionize-road-safety, Jun. 18, 2015 [retrieved on Oct. 3, 2018], 3 pages.
Urban Street Design Guide, National Association of City Transportation Officials, Available online at: https://nacto.org/publication/urban-street-design-guide!, 2013 [retrieved on Oct. 3, 2018], 8 pages.
Bougler et al., Investigation of Elderly Driver Safety and Comfort: In-Vehicle Intersection "Gap Acceptance Advisor" and Identifying Older Driver Needs, California PATH Research Report, UCB-ITS-PRR-2005-36, Available online at: https://merritt.cdlib.org/d/ark%3A%2F13030%2Fm5kh0pfx/2/producer%2FPRR-2005-36.pdf, Nov. 2005, 163 pages.
Bougler et al., California Intersection Decision Support: A Driver-Centered Approach to Left-Turn Collision Avoidance System Design, California PATH Research Report, UCB-ITS-PRR-2008-1, Jan. 2008, 106 pages.
Chan et al., California Intersection Decision Support: A Systems Approach to Achieve Nationally Interoperable Solutions, UCB-ITS-PRR-2005-11, California PATH Research Report, Apr. 2005, 212 pages.
Chen et al., Evaluation Methods and Results of the Intersafe Intersection Assistants, In 2007 IEEE Intelligent Vehicles Symposium, Available online at : https://doi.org/10.1109/IVS.2007.4290105, Jul. 2007, pp. 142-147.
Chen et al., Integrating Dashcam Views through Inter-Video Mapping, 2015 IEEE International Conference on Computer Vision (ICCV), Available online at: http://doi.org/10.1109/ICCV.2015.356, Dec. 2015, pp. 3110-3118.
Cody et al., Observation of Gap Acceptance During Intersection Approach, Proceedings of the Fourth International Driving Symposium on Human Factors in Driver Assessment, Training and Vehicle Design, Available online at: https://doi.org/10.17077/drivingassessment.1256, Jul. 2007, pp. 321-327.
Coxworth, See-through System Turns View-blocking Vehicles Transparent, New Atlas, Available online at: https://newatlas.com/see-through-system/29446/, Oct. 18, 2013 [retrieved on Oct. 3, 2018], 2 pages.
Gelbal et al., Elastic Band Based Pedestrian Collision Avoidance Using V2X Communication, 2017 IEEE Intelligent Vehicles Symposium (IV), Jun. 2017, pp. 270-276.
Gomes et al., Making Vehicles Transparent Through V2V Video Streaming, IEEE Transactions on Intelligent Transportation Systems, vol. 13, Issue 2, Available online at: http://doi.org/10.1109/TITS.2012.2188289, Jun. 2012, pp. 930-938.
Gomes et al., The See-through System: From Implementation to Test-drive, In 2012 IEEE Vehicular Networking Conference (VNC), Available online at: http://doi.org/10.1109/VNC.2012.6407443, Nov. 2012, pp. 40-47.
Judvaitis et al., Object Transparent Vision Combining Multiple Images from Different Views, Automatic Control and Computer Sciences, vol. 49, Issue 5, Sep. 2015, pp. 313-320.
Judvaitis et al., Improving Object Transparent Vision Using Enhanced Image Selection, Automatic Control and Computer Sciences, vol. 49, Issue 6, Nov. 2015, pp. 380-389.
Li et al., Multi-Vehicle Cooperative Perception and Augmented Reality for Driver Assistance: A Possibility to "see" Through Front Vehicle, 2011 14th International IEEE Conference on Intelligent Transportation Systems (ITSC), Available online at: http://doi.org/10.1109/ITSC.2011.6083061, Oct. 2011, pp. 242-247.
Misener et al., California Intersection Decision Support: A Systems Approach to Achieve Nationally Interoperable Solutions II, California PATH Research Report, UCB-ITS-PRR-2007-1, Available online at: https://merritt.cdlib.org/d/ark:%252F13030%252Fm56m37xk/3/producer%252FUCB-ITS-PRR-2007-1.pdf, Jan. 2007, 335 pages.
Misener et al., Cooperative Intersection Collision Avoidance System (CICAS): Signalized Left Turn Assist and Traffic Signal Adaptation, California PATH Research Report, UCB-ITS-PRR-2010-20, Apr. 2010, 246 pages.
Mortensen, FTA Office of Research, Demonstration and Innovation Safety Pilot Model Deployment—Transit, presented at U.S. DOT Connected Vehicle 2013 Public Meeting, RITA Research and Innovation Technology Administration, U.S. Department of Transportation, Sep. 24, 2013, 12 pages.
Naughton, Bosch System Can Warn Drivers of Unseen Hazards, The Detroit News, Available online at: https://www.detroitnews.com/story/business/autos/2018/06/05/bosch-develops-driver-warning-system/671125002/, Jun. 5, 2018, 2 pages.
Nowakowski, A Preliminary Evaluation of a Driver-Infrastructure Interface for a Left-Turn Warning, Proceedings of the Human Factors and Ergonomics Society Annual Meeting, vol. 50, Issue 22, Available online at: https://doi.org/10.1177/154193120605002222,Oct. 1, 2006, pp. 2453-2457.
Nowakowski et al., Comparison of Infrastructure and In-Vehicle Driver Interfaces for Left-Turn Warnings, Transportation Research Record: Journal of the Transportation Research Board, vol. 2069, No. 1, Available online at: https://doi.org/10.3141/2069-05, Jan. 1, 2008, pp. 33-40.
Olaverri-Monreal et al., The See-through System: A Vanet-enabled Assistant for Overtaking Maneuvers, In 2010 IEEE Intelligent Vehicles Symposium, Available online at: http://doi.org/10.1109/IVS.2010.5548020, Jun. 2010, pp. 123-128.
Rameau et al., A Real-Time Augmented Reality System to See-Through Cars, IEEE Transactions on Visualization and Computer

(56) References Cited

OTHER PUBLICATIONS

Graphics, vol. 22, Issue 11, Available online at: http://doi.org/10.1109/TVCG.2016.2593768, Jul. 27, 2016, pp. 2395-2404.

Rusch et al., Augmented Reality Cues to Assist Older Drivers with Gap Estimation for Left-turns, Accident Analysis & Prevention, vol. 71, Available online at: https://doi.org/10.1016/J.AAP.2014.05.020, Oct. 2014, pp. 210-221.

Zennaro et al., A 'State Map' Architecture for Safe Intelligent Intersections, In ITS America 2003 13th Annual Meeting, Available online at: https://pdfs.semanticscholar.org/3a4e/c2ba404884ce0d8c1a46d690147865cad566.pdf, 2003, 12 pages.

"Valeo XtraVue. See Through Cars", YouTube, Available Online at: https://www.youtube.com/watch?v=F4-wWfCcyK4, Jul. 20, 2018, 1 page.

International Search Report and Written Opinion—PCT/EP2019/071060—ISA/EPO—Oct. 29, 2019, 13 pages.

Rameau et al., "A Real-Time Vehicular Vision System to Seamlessly See-Through Cars", International Conference on Computer Analysis of Images and Patterns, Nov. 3. 2016, pp. 209-222.

Thompson et al., "Enhancing Driver Awareness Using See-Through Technology", SAE Technical Paper Series, vol. 1, Apr. 3, 2018, 9 pages.

Yuan et al., "A Lightweight Augmented Reality System to See-Through Cars", 7th International Congress on Advanced Applied Informatics, Jul. 8, 2018, pp. 855-860.

U.S. Appl. No. 16/203,493, "Non-Final Office Action", dated Jan. 15, 2020, 15 pages.

\* cited by examiner

CONDITIONAL AVAILABILITY OF VEHICULAR MIXED-REALITY

BACKGROUND

Aspects of the disclosure relate to mixed reality and more specifically to providing "see-through" functionality to the driver of a vehicle. In a scenario where a lead vehicle is ahead of a following vehicle, the lead vehicle can often obscure the view of the driver of the following vehicle. This can lead to unsafe conditions. Mixed reality has been proposed as an effective solution to combat such problems, by providing a view to the driver of the following vehicle which simulates an ability to see through the lead vehicle and make objects blocked by the lead vehicle become visible. However, many challenges arise in providing such see-through functionality in a safe and effective manner.

BRIEF SUMMARY

Certain embodiments are described for providing a mixed-reality scene involving a lead vehicle and a following vehicle. In one embodiment, the system may present a sequence of mixed-reality images to a driver of the following vehicle, wherein at least one image in the sequence of mixed-reality images results from merging (a) an image captured by a camera aboard the lead vehicle and (b) an image captured by a camera aboard the following vehicle, to generate a merged image. The merging may comprise de-emphasizing an occluded portion of the image captured by the camera aboard the following vehicle, the occluded portion corresponding to occlusion by the lead vehicle, and emphasizing an unoccluded portion of the image captured by the camera aboard the lead vehicle. In response to one or more detected conditions, the system may discontinue or diminish mixed-reality content of the sequence of mixed-reality images presented to the driver of the following vehicle. In particular, the one or more detected conditions may comprise detection of an object between the lead vehicle and the following vehicle, wherein in the merged image, a view of the object is potentially masked as result of de-emphasizing the occluded portion of the image captured by the camera aboard the following vehicle and emphasizing the unoccluded portion of the image captured by the camera aboard the lead vehicle.

In one embodiment, the de-emphasizing of the occluded portion of the image captured by the camera aboard the following vehicle and the emphasizing of the unoccluded portion of the image captured by the lead vehicle may comprise blending the image captured by the camera aboard the following vehicle and the image captured by the camera aboard the lead vehicle.

In another embodiment, the de-emphasizing of the occluded portion of the image captured by the camera aboard the following vehicle and the emphasizing of the unoccluded portion of the image captured by the lead vehicle may comprise replacing the occluded portion of the image captured by the camera aboard the following vehicle with the unoccluded portion of the image captured by the lead vehicle.

The diminishing of the mixed-reality content of the sequence of mixed-reality images may comprise emphasizing the occluded portion of the image captured by the camera aboard the following vehicle and de-emphasizing the unoccluded portion of the image captured by the camera aboard the lead vehicle.

In addition, the one or more detected conditions may further comprise detection of a braking condition associated with the lead vehicle. The one or more detected conditions may further comprise detection of at least one relevant maneuver performed by the following vehicle. The at least one relevant maneuver may be selected from an over-taking maneuver, a right turn, a mid-block pedestrian crossing event, or an unexpected lead vehicle stop. The one or more detected conditions may further comprise detection of improper camera alignment associated with the camera aboard the lead vehicle and the camera aboard the following vehicle. The one or more detected conditions may further comprise determination that a candidate lead vehicle is not positioned in front of the following vehicle. Finally, the one or more detected conditions may further comprise determination that no vehicle equipped with a camera for supporting see-through functionality is found nearby.

According to various embodiments, discontinuing or diminishing mixed-reality content of the sequence of mixed-reality images comprises, in the merged image, presenting a representation of the object between the lead vehicle and the following vehicle. The representation of the object between the lead vehicle and the following vehicle may be presented by (1) defining a region in the merged image containing the object between the lead vehicle and the following vehicle and (2) in the defined region, presenting the representation of the object between the lead vehicle and the following vehicle instead of the unoccluded portion of image captured by the lead vehicle. In one embodiment, the region in the merged image containing the object between the lead vehicle and the following vehicle is defined to follow contours of the object between the lead vehicle and the following vehicle. In another embodiment, the region in the merged image containing the object between the lead vehicle and the following vehicle is defined as a bounding box. For example, the bounding box may have a rectangular shape.

BRIEF DESCRIPTION OF THE DRAWINGS

Aspects of the disclosure are illustrated by way of example. In the accompanying figures, like reference numbers indicate similar elements.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Figure 1:
FIG. 1 illustrates a mixed-reality image presented to the driver of a following vehicle that simulates an ability to see through a lead vehicle.

FIG. 1 illustrates a mixed-reality image presented to the driver of a following vehicle that simulates an ability to see through a lead vehicle. Here, a lead vehicle 102 is stopped at a crosswalk. FIG. 1 shows the view from the perspective of the driver of the following vehicle (not shown), which is positioned directly behind the lead vehicle 102 and oriented in the same direction. Pedestrians 104 are crossing the crosswalk. However, in certain scenarios, the driver of the following vehicle cannot see pedestrians 104, because they are occluded, i.e., blocked from view, by the lead vehicle 102. This presents a potentially unsafe driving condition. For example, if the driver of the following vehicle does not realize that pedestrians 104 are crossing the crosswalk and becomes impatient, the driver of the following vehicle may attempt to drive around the lead vehicle, which can lead to a situation of possibly striking pedestrians 104. While FIG. 1 shows a situation in which pedestrians are occluded from view, other vehicles, animals, or other moving or still objects can also be occluded from view due to a lead vehicle. Unsafe situations caused by a lead vehicle blocking a following vehicle's view is not necessarily limited to crosswalks but may arise at other locations such parking lots, intersections, roadways, etc.

To address this and similar scenarios, a mixed-reality image 106 can be presented to the driver of the following vehicle to "see through" the lead vehicle. The mixed-reality image 106 can be presented on a display mounted in the dashboard of the following vehicle, integrated into the windshield of the following vehicle, implemented as a "heads-up" display of the following vehicle, etc. For example, the display may be a liquid crystal display (LCD), a head mounted display (HUD), or other augmented reality (AR) display. The mixed-reality image 106 can be presented as a single image, e.g., a still frame, or as a part of a sequence of mixed-reality images that make up a video stream presented to the driver of the following vehicle. In various embodiments, the generation and presentation of the mixed-reality images is associated with minimal time lag, such that the video stream may be considered a live video stream and may be used by the driver of the following vehicle as an effective visual aid while driving.

The mixed-reality image 106 can be generated by merging an image captured from a camera aboard the lead vehicle with an image captured from a camera aboard the following vehicle, to form a merged image. In various embodiments, the mixed-reality image 106 may include a see-through region 108. Outside the see-through region 108, the mixed-reality image 106 may simply be the same as the image captured by the camera aboard the following vehicle. Inside the see-through region 108, the mixed-reality image 106 may be formed by emphasizing an occluded portion of the image captured by the camera aboard the following vehicle and de-emphasizing an unoccluded portion of the image captured by the lead vehicle. The occluded portion of the image captured by the camera aboard the following vehicle may be a portion of the image that corresponds to occlusion by the lead vehicle. For example, the occluded portion may be defined as the area in the image occupied by the lead vehicle (or a part of such an area).

De-emphasizing and emphasizing may be performed in different ways. In the embodiment shown in FIG. 1, de-emphasizing and emphasizing is accomplished by blending the image captured by the camera aboard the following vehicle and the image captured by the camera aboard the lead vehicle. Such image blending may be performed using various digital compositing techniques. Just as an example, digital compositing using alpha blending may be implemented. Different portions of the image may be combined using different weights. Also, gradients may be used for the combining. For instance, in FIG. 1, the center region of the image may be associated with a first blending factor (e.g., a constant referred to as "alpha_1"), and the regions at the outer borders of the image may be associated with a second blending factor (e.g., a constant referred to as "alpha_2"). Just as an example, the blending factor may increase linearly from alpha_1 to alpha_2 between the center region and the regions at the outer borders of the image. In another embodiment, de-emphasizing and emphasizing is accomplished by simply replacing the occluded portion of the image captured by the camera aboard the following vehicle with the unoccluded portion of the image captured by the camera aboard the lead vehicle, to form the see-through region 108 of the merged image.

Figure 2:
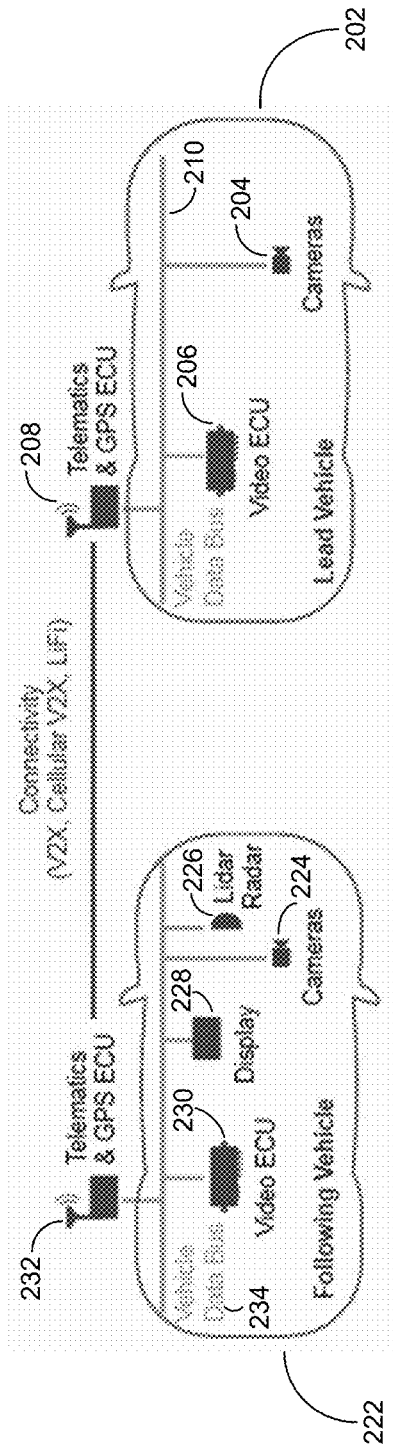
FIG. 2 presents an overview of hardware components used to implement see-through mixed reality involving a lead vehicle and a following vehicle, according to an embodiment of the invention.

FIG. 2 presents an overview of various hardware components used to implement see-through mixed reality involving a lead vehicle and a following vehicle, according to an embodiment of the invention. Here, a lead vehicle 202 and a following vehicle 222 are shown. Lead vehicle 202 may be equipped with various devices including one or more cameras 204, a video electronic control unit (ECU) 206, and a telematics and global positioning system (GPS) ECU 208, all coupled to a vehicle data bus 210. Following vehicle 222 may be equipped with various devices including one or more cameras 224, Light Detection and Ranging (LIDAR) and/or Radio Detection and Ranging (RADAR) detectors 226, a display 228, a video ECU 230, and a telematics and GPS ECU 232, all coupled to a vehicle data bus 234. An ECU, such as the video ECU 206 or the telematics and GPS ECU 208, may comprise one or more processors executing code for performing programmed instructions for carrying out specific tasks described herein. An ECU may also incorporate hardware components such as video, communications, positioning (e.g., GPS) components to support various functionalities. More details relating to an example ECU are provided in FIG. 8, discussed in a later section of the present disclosure.

These components aboard the lead vehicle 202 and the following vehicle 222 may work together to communicate data and construct a mixed-reality scene, e.g., a "see-through" video stream, that is presented to the driver of the following vehicle 202. Cameras 204 aboard the lead vehicle 202 may provide a "see-through" view to the driver of the following vehicle 222, so that objects in front of the vehicle that would otherwise be occluded from view can become visible. Aboard lead vehicle 202, the raw images from cameras 204 may be forwarded to the video ECU 206 over the vehicle data bus 210. Here, the video ECU 206 may select the appropriate camera view or stitch together views of several of the cameras 204, to form the images provided by the lead vehicle 202. As shown, the video ECU 206 is implemented as a separate device on the vehicle data bus 210. However, in alternative embodiments, the video ECU 206 may be part of one or more of the cameras 204 or integrated into the telematics and GPS ECU 208. Other alternative implementations are also possible for the components shown in FIG. 2.

Connectivity between the lead vehicle 202 and the following vehicle 222 may be provided by telematics and GPS ECU 208 aboard the lead vehicle 202 and the telematics and GPS ECU 232 aboard the following vehicle 222. For example, the images provided by the lead vehicle 202 may be forwarded over a vehicle-to-vehicle (V2V) communications link established between telematics and GPU ECUs 208 and 232. Different types of V2V links may be established, such as WLAN V2V (DSRC), cellular V2V, Li-Fi, etc. Also, connectivity between the lead vehicle 202 and the following vehicle 222 isn't necessarily restricted to V2V communications. Alternatively or additionally, the connectivity between the two vehicles may be established using vehicle-to-network (V2N) communications, e.g., forwarding data through an intermediate node.

At the following vehicle 222, similar components (e.g., one or more cameras 224, a video ECU 230, a telematics and GPS ECU 232, etc.) and additional components, including the LIDAR and/or RADAR detectors 226 and display 228 may be deployed. The LIDAR and/or RADAR detectors 226 aboard the following vehicle 222 facilitate precise determination of the position of the lead vehicle 202 relative to the following vehicle 222. The relative position determination may be useful in a number of ways. For example, the precise relative position of the lead vehicle 202 may be used to confirm that the lead vehicle is the correct partner with which to establish V2V communications. The precise relative position of the lead vehicle 202 may also be used to enable and disable "see-through" functionality under appropriate circumstances, as well as control how images from the two vehicles are superimposed to form the see-through video stream. The video ECU 230 aboard the following vehicle 222 may perform the merger of the images from the lead vehicle 202 and the images from the following vehicle 222, to generate the see-through video stream. Finally the see-through video stream is presented to the driver of the following vehicle on the display 228.

Figure 3:
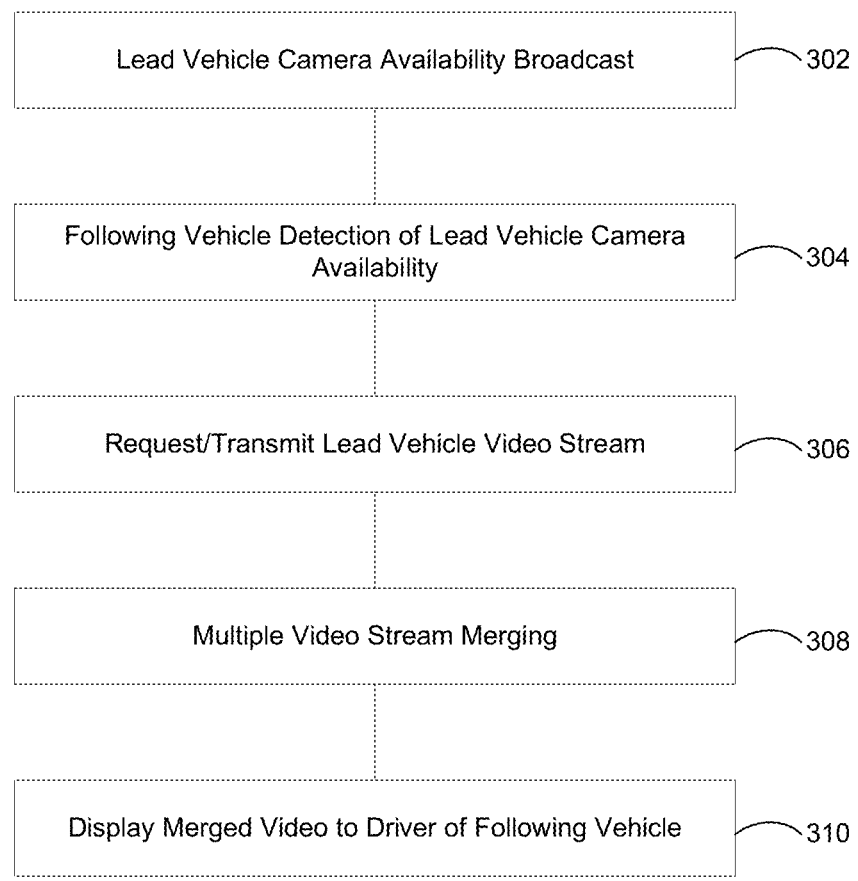
FIG. 3 is a flow chart showing steps in an overall process for generating see-through mixed reality involving a lead vehicle and a following vehicle, according to an embodiment of the invention.

FIG. 3 is a flow chart showing steps in an overall process for generating see-through mixed reality involving a lead vehicle and a following vehicle, according to an embodiment of the invention. Here, the process 300 includes steps 302 through 310. At a step 302, the lead vehicle performs a camera availability broadcast. This may be a broadcast to announce that the lead vehicle possesses a camera that is available to support "see-through" capability. Contents of the broadcast message may include: time, GPS location, speed, travel direction, vehicle physical dimensions (e.g., length, width, height), camera information (e.g., X, Y, X mounting location, direction, and field of view information), etc. The broadcast would be sent to other vehicles within range of the broadcast communication using one or more links such as WLAN (DSRC), Cellular, Li-Fi, or other V2V communication channels. Alternatively or additionally, the lead vehicle may register its camera availability, including data such as that listed above, with a registry, e.g., a cloud server, using a wireless link such as a 4G or 5G cellular network connection. The registry would aggregate vehicle locations and camera availability information, to allow the data to be searched by other vehicles, such as vehicles not in direct V2V communication range. Step 302 may be performed by an ECU, e.g., a video ECU and/or a telematics and GPS ECU, aboard the lead vehicle.

At a step 304, the following vehicle may detect the lead vehicle camera availability. For example, the following vehicle may poll available data sources, e.g., registries, for all nearby vehicle camera systems available to support "see-through" functionality. This could be a list received from the cloud based on the following vehicle's current GPS coordinates, or it can be a compiled list of nearby vehicles whose broadcasts have been received by the following vehicle. As mentioned previously, such broadcasts may be received through links such as DSRC, Cellular, Li-Fi, or other V2V communication channels. Next, the following vehicle may compare its own GPS position and heading with the GPS positions and headings of nearby vehicles that have indicated camera availability. By calculating differences in measures such as compass heading, relative bearing, and distance, the list of nearby vehicles with available cameras can be filtered down to more restricted list of candidate vehicles with cameras that could potentially be in front of the following vehicle. Next, readings from the LIDAR and/or RADAR detectors abroad the following vehicle may be used to select and confirm that a vehicle hypothesized to be the lead vehicle is indeed directly in front of the following vehicle. For example, if a candidate vehicle with an available camera is 100 meters away and traveling at 20 mph, but the LIDAR and/or RADAR detectors of the following vehicle indicates that the vehicle in front of the following vehicle is actually 50 meters away and traveling at 30 mph, then the candidate vehicle may be rejected as a potential lead vehicle. In another embodiment, license plate number of the candidate vehicle may be compared with the license plate of the vehicle in front of the following vehicle to verify the selection. Step 304 may be performed by an ECU, e.g., a video ECU and/or a telematics and GPS ECU, aboard the following vehicle.

At a step 306, the following vehicle may request for a transmission of the lead vehicle's video stream, and the lead vehicle may transmit the requested video stream. When the following vehicle determines that it is indeed following a lead vehicle with an available camera, the following vehicle may send a request for the video stream of the lead vehicle. In one embodiment, the following vehicle sends V2V-based video request directly to the lead vehicle. This may be a request sent from the telematics and GPS ECU of the following vehicle to the telematics and GPS ECU of the lead vehicle. In another embodiment, the following vehicle sends a cloud-based video request to a registry, e.g., a server. Data on how to request the video stream, such as an IP address, may be stored in the cloud along with the lead vehicle's GPS record. Next, the following vehicle may provide the lead vehicle with contextual information for the video request such as following distance, heading, desired camera view, preferred communication protocol, negotiated video quality based on signal strength, etc. In response, the lead vehicle may transmit the requested video stream to the following vehicle. The lead vehicle may do so based on the contextual information provided by the following vehicle, to customize the video stream sent to the following vehicle. The lead vehicle may also adjust the video quality and compression ratio for the transmission based on factors such as available communication bandwidth and signal strength. In addition, the lead vehicle may expand (e.g., using multiple cameras) or crop the video stream field of view to better match the needs of the following vehicle, based on information such as the following distance of the following vehicle. For example, if the following vehicle is very close, the lead vehicle may need a wider field of view to eliminate blind spots. Thus, the lead vehicle may decide to combine views from multiple forward and side cameras to create a customized video stream for the following vehicle. As another example, if the following vehicle is relatively far away, such that the area of interest is only a narrow field of view in the forward direction, the lead vehicle may respond by providing a video stream of a narrower field of view at a higher resolution or bit rate, to accommodate the needs of the following vehicle. In this manner, the lead vehicle may respond to the request by providing an appropriate video stream for the following vehicle. The following vehicle may receive the lead vehicle's video stream. Certain portions of step 306 such as making the request for the lead vehicle video stream and receiving the video stream may be performed by an ECU, e.g., a video ECU and/or a telematics and GPS ECU, aboard the following vehicle. Other portions of step 306 such as responding to the request, generating the lead vehicle video stream, and sending the lead vehicle video stream may be performed by an ECU, e.g., a video ECU and/or a telematics and GPS ECU, aboard the lead vehicle.

At a step 308, the lead vehicle and following vehicle video streams are merged to form the "see-through" video stream. Each image in the lead vehicle video stream may be overlaid on a corresponding image from the following vehicle's video stream, to generate a sequence of merged images that form a "see-through" video stream which mixes the realities seen by the lead vehicle and the following vehicle. As discussed previously, techniques for blending images, such as digital compositing, may also be used in certain embodiments. The merging or stitching together of a first image from the lead vehicle and with a second image from the following vehicle may involve properly shifting, sizing, and/or distorting the first and second images so that features may be properly aligned. This process may take into account vehicle and camera position and orientation information, such as known lead vehicle and following vehicle camera information, known GPS information for both vehicles, and the following vehicle's LIDAR and/or RADAR information on the position of the lead vehicle. Step 308 may be performed by an ECU, e.g., a video ECU and/or a telematics and GPS ECU, aboard the following vehicle.

At a step 310, the "see-through" video stream is displayed to the driver of the following vehicle. The resulting mixed-reality video stream provides a view that is consistent with the perspective of the driver of the following vehicle. The merged video stream may be displayed to the driver of the following vehicle on a user interface such as an LCD, HUD, or other augmented reality (AR) display. The depiction of the mixed-reality view can be implemented in different ways. In one example, the lead vehicle may be "disappeared" completely from the mixed-reality scene presented to the driver of the following vehicle. In another example, the lead vehicle may appear as a partially transparent object in the mixed-reality scene presented to the driver of the following vehicle. In another example, the lead vehicle may appear as only an outline in the mixed-reality scene presented to the driver of the following vehicle. In yet another example, using a dynamic video point-of-view transition, the mixed-reality scene may "zoom in" on or appear to "fly through" the lead vehicle, to give the viewer (driver of the following vehicle) the impression that the perspective has shifted from that of the following vehicle to that of the lead vehicle. Step 310 may be performed by an ECU, e.g., a video ECU and/or a telematics and GPS ECU, aboard the following vehicle.

Figure 4A:
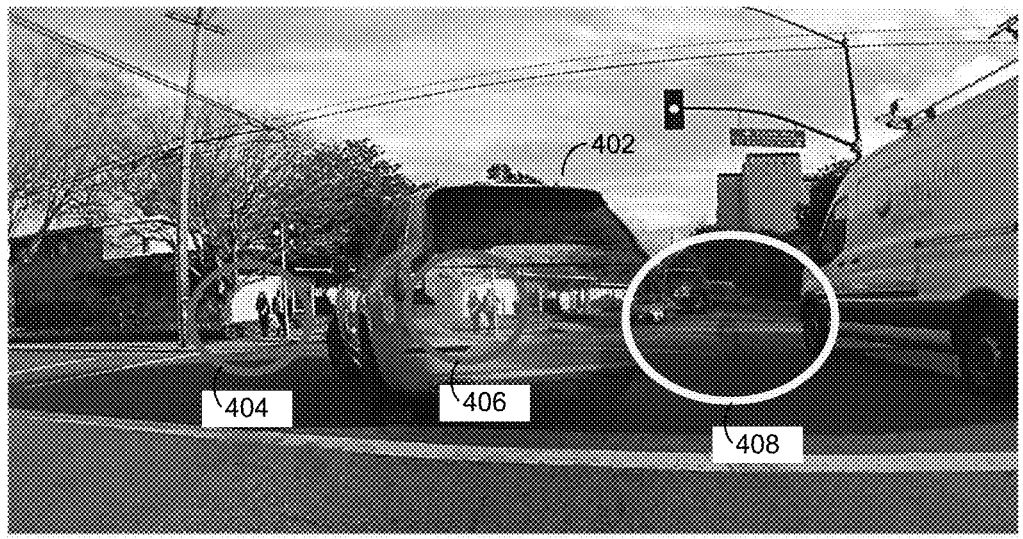
FIG. 4A illustrates a scenario in which bad camera alignment used in a mixed-reality view for seeing through a lead vehicle can misrepresent the physical world.

FIG. 4A illustrates a scenario in which bad camera alignment used in a mixed-reality view for seeing through a lead vehicle can misrepresent the physical world. FIG. 4A presents a mixed-reality scene as seen from the perspective of a following vehicle. In the scene, a lead vehicle 402 is making a left turn at an intersection. A couple of pedestrians are standing at a first location 404 on the corner of the intersection, in front of the lead vehicle 402. Due to the turning maneuver of the lead vehicle 402, the camera aboard the lead vehicle and the camera aboard the following vehicle has gotten too far out of alignment. As such, an image taken from the lead vehicle's camera cannot be properly merged or stitched together with a corresponding image from the following vehicle's camera. A forced merger of the images from the cameras aboard the lead vehicle and following vehicle may result in a merged image that depicts a copy, i.e., "double image" of the same pedestrians at a location 406 within the mixed-reality scene. This is a misrepresentation of reality, because the merged image shows more pedestrians (i.e., four pedestrians) than there actually exist (i.e., two pedestrians) in the real world.

As another example, the same misalignment problem causes the merged image of FIG. 4A to obscure and misplace a relevant vehicle in the real-world road scene, creating a potential safety hazard for the following driver. Here, a ghost image of a silver car appears at location 408 in the merged image. The silver car actually exists in the real world, just not at location 408. Instead, the silver car is actually located in front of the leading vehicle but is blocked from view by the leading vehicle in FIG. 4A. In fact, the silver car is facing the leading vehicle and attempting to make a left turn. However, because of the misalignment between the camera aboard the leading vehicle and camera aboard the following vehicle, the merged image of the "see-through" mixed-reality scene generates the ghost image of the silver car at location 408. First, the ghost image presents the silver car at an incorrect location, i.e., location 408, because the severity of the camera misalignment makes it impossible to properly shift the images from the two cameras prior to merger. Forced merger without the proper alignment results in the ghost image of the silver car appearing in the wrong location within the scene. Second, the ghost image appears faint because the merging algorithm has de-emphasized the portion of image captured by the lead vehicle containing the silver car, because it is outside the "see-through" region, which in this case is the portion of the image occupied by the lead vehicle. Thus, the faint, misplaced ghost image of the silver car appears at location 408. This is a misrepresentation of reality that should not be presented to the driver of the following vehicle.

Figure 4B:
FIG. 4B is an image of the real-world road scene moments after the mixed-reality scene shown in FIG. 4A is captured and presented.

FIG. 4B is an image of the real-world road scene moments after the mixed-reality scene shown in FIG. 4A is captured and presented. As seen in FIG. 4B, the silver car is actually facing the lead vehicle and attempting to make a left turn. FIG. 4B shows that the silver car is at location 410 in the real world. This clearly demonstrates that the mixed-reality scene shown in FIG. 4A misrepresented both the existence and position of the silver car—there in fact was no car present at location 408 in the scene depicted by FIG. 4A. Presentation of the mixed-reality scene shown in FIG. 4A to the driver of the following vehicle thus creates a dangerous misrepresentation that should be avoided.

Figure 5:
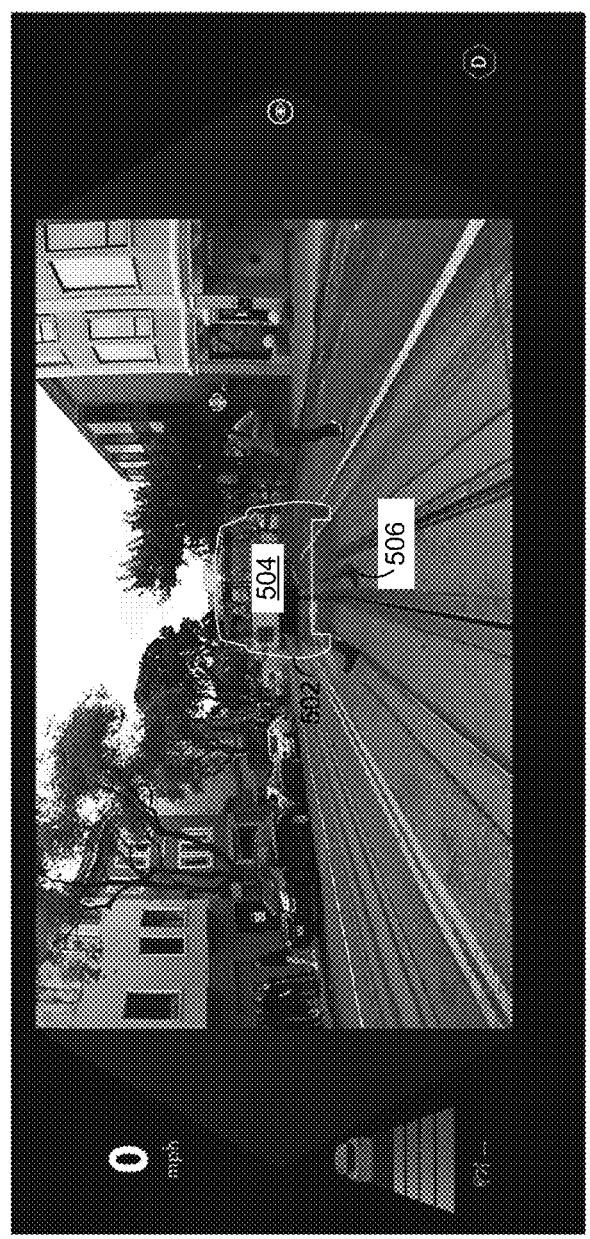
FIG. 5 illustrates a scenario in which an object physically located between a lead vehicle and a following vehicle can become masked in a mixed-reality view for seeing through a lead vehicle, in another misrepresentation of the physical world.

FIG. 5 illustrates a scenario in which an object physically located between a lead vehicle and a following vehicle can become masked in a mixed-reality view for seeing through a lead vehicle, in another misrepresentation of the physical world. FIG. 5 presents a mixed-reality scene as seen from the perspective of a following vehicle. In the scene, a lead vehicle 502 is represented by a visible outline. However, because see-through functionality is enabled, the lead vehicle has been "disappeared" from the scene, to show objects such as a trolley car 504 ahead of the lead vehicle. The image of trolley car 504 is captured by the camera aboard the lead vehicle 502 and merged with the image captured by the following vehicle. Here, a pedestrian 506 is physically located between the lead vehicle 502 and the following vehicle. However, as shown in FIG. 5, the merged image presented to the driver of the following vehicle effectively "disappears" pedestrian 506 as well, in the process of "disappearing" the lead vehicle 502. This can occur as the result of the merging process, in which (1) a portion of the image captured by the camera of following vehicle is de-emphasized, (2) a corresponding portion of image captured by the camera of the leading vehicle 502 is emphasized, and (3) the two portions of image are overlaid. Relying on the merged image shown in FIG. 5, the driver of the following vehicle may mistakenly conclude that there is nothing between the lead vehicle 502 and the following vehicle. Seeing no reason to stop, the driver of the following vehicle may proceed forward and strike the pedestrian 506. Thus, the merged image creates yet another dangerous misrepresentation of reality.

Figure 6:
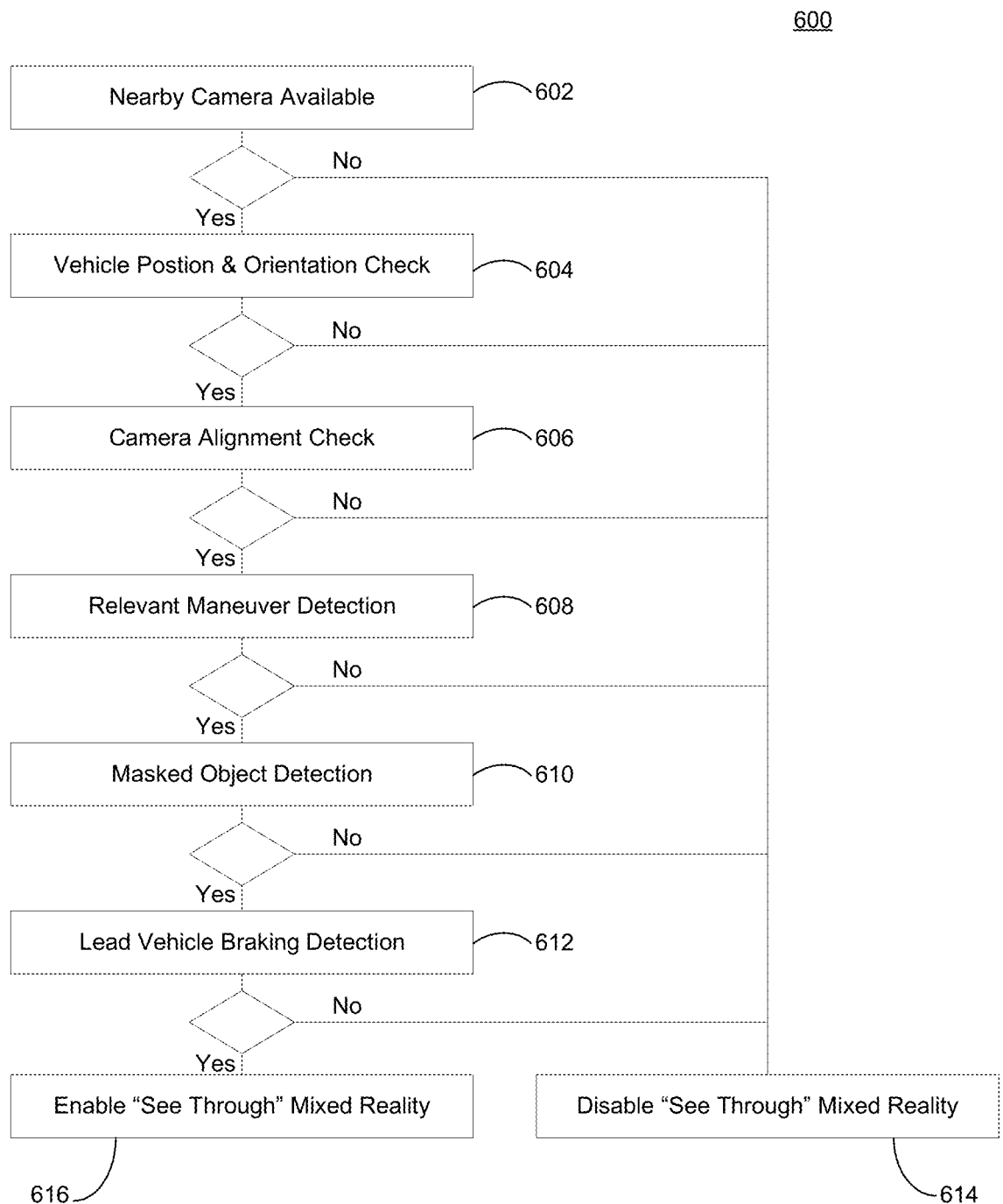
FIG. 6 is a flowchart illustrating a process for automatically enabling and disabling a see-through mixed-reality functionality for display to a driver of a following vehicle, according to an embodiment.

FIG. 6 is a flowchart illustrating a process 600 for automatically enabling and disabling a "see-through" mixed-reality functionality for display to a driver of a following vehicle, according to an embodiment. As demonstrated previously, there are certain situations in which see-through functionality can be beneficial to enhance safety for a driver of a following vehicle. However, there are also situations in which "see-through" functionality can misrepresent reality and actually become dangerous. Thus, a technique such as that presented in process 600 may automatically enabled see-through functionality when it would be beneficial to the driver of the following vehicle or disabled the functionality when it is not beneficial, based on the detection of certain conditions.

At a step 602, a check is performed to determine whether nearby cameras are available to support providing "see-through" functionality. As discussed previously, this may be done by the following vehicle in various ways, including (1) receiving a broadcast message directly from a lead vehicle announcing that it has camera(s) available for supporting see-through functionality and/or (2) receiving a list of records from a registry, e.g., from a cloud server, of nearby vehicles having camera(s) to support such functionality. The camera availability message or record may include useful data for confirming that a candidate lead vehicle is an appropriate lead vehicle for the following vehicle, as well as data useful for determining whether see-through functionality should otherwise be enabled or disabled. Such data may include, for example:

Time,
GPS location (latitude, longitude)
Speed, acceleration, braking flag
Heading/travel direction
Vehicle size information (length, width, height)
Camera mounting information (X, Y, Z, mounting location)
Camera direction and field of view information If no vehicle equipped with a camera to support see-through functionality is found nearby, then the process 600 proceeds to a step 614 to automatically disable the functionality. Otherwise, the process 600 proceeds to a subsequent check step.

At a step 604, a check is performed to determine whether the position and orientation of the candidate lead vehicle indicate that it is indeed the vehicle immediately preceding the following vehicle. Just as an example, the check may involve evaluating whether the relative bearing from the following vehicle to the candidate lead vehicle (e.g., from GPS readings) match the following vehicle's direction of travel (e.g., also from GPS readings), to within acceptable tolerance limits to attain a level of confidence that the candidate lead vehicle is in front of the following vehicle. As another example, the check may involve determining whether the candidate lead vehicle is detected by forward sensors (e.g., LIDAR, RADAR, and/or camera(s)) aboard the following vehicle. As another example, the check may involve comparing the distance between the candidate lead vehicle and following vehicle, as computed from GPS positions, with the distance between the candidate lead vehicle and the following vehicle, as computed from forward sensors (e.g., LIDAR, RADAR, and/or camera(s)) aboard the following vehicle. The comparison may evaluate whether the difference between such distances is within an acceptable tolerance limit. As another example, the check may involve comparing the speed reported by the candidate lead vehicle with the speed of the candidate lead vehicle as detected using forward sensors aboard the following vehicle, the comparison may evaluate whether the difference between such speeds is within an acceptable tolerance limit. As yet another example, the check may involve evaluating whether the candidate lead vehicle and the following vehicle are traveling in the same lane of roadway, as determined based on GPS traces over time. As a result of step 604, if the position and orientation of the candidate lead vehicle indicate that it is not the vehicle immediately preceding the following vehicle, the process 600 proceeds to step 614 to automatically disable the see-through functionality. Otherwise, the process 600 proceeds to a subsequent check step.

At a step 606, a check is performed to determine whether the camera(s) aboard the lead vehicle and the camera(s) aboard the following vehicle are in alignment. Here, proper alignment may not necessarily require the cameras to point in exactly the same direction or the two vehicles to be perfectly aligned. Rather, being in alignment may refer to the cameras being within a tolerable range of relative orientations in view of their position, angle, and field of view. Proper alignment of cameras in this context is explained in more detail with respect to FIGS. 7A, 7B, and 7C, which are discussed later. For example, at step 606, the following vehicle may use information such as (1) the vehicle headings and relative bearing (e.g., from GPS readings), (2) lead vehicle distance (e.g., as measured by forward sensors such as LIDAR and/or RADAR), and (3) camera information (e.g., as provided by a V2V broadcast from the lead vehicle or from a registry such as a cloud-based server) to determine whether the lead vehicle and following vehicle cameras are aligned, in view of the position of the vehicles and the overlap of the respective fields of views of their cameras, to support see-through functionality. In addition, the following vehicle may also access the lead vehicle's steering angle, in order to more rapidly predict whether the respective cameras of the lead and following vehicle are about to fall out of alignment. This may allow the system to enable or disable see-through functionality more quickly. As a result of step 606, if camera alignment is or is about to become improper, the process 600 proceeds to step 614 to automatically disable see-through functionality. Otherwise, the process 600 proceeds to a subsequent check step.

At a step 608, various relevant vehicle maneuvers are detected. See-through functionality may be useful in these particular vehicle maneuvers. Thus, if any of the relevant maneuvers identified in the non-exhaustive list provided below are detected, the system may allow the process to go forward for enabling see-through functionality:

Overtaking—following vehicle is behind a slower lead vehicle, e.g., on a two-lane road, and the a passing situation is appropriate Right turn—following vehicle is behind a lead vehicle that is intending to turn right (e.g., as indicated by right turn signal, which may be communicated to the following vehicle). Here, the lead vehicle may be stopped due to traffic or pedestrians crossing. See-through functionality may allow the following vehicle to see the traffic or pedestrians crossing in front of the lead vehicle. This can help the driver of the following vehicle understand the reason the lead vehicle is stopped, thus easing impatience on the part of the driver of driver and potentially preventing an unsafe driver reaction (e.g., attempting to overtake the lead vehicle).

Mid-block pedestrian crossing—lead vehicle comes to a stop in the middle of a block (i.e., not at an intersection) due to a pedestrian or other obstruction in the roadway. See-through functionality may help the driver of the following vehicle see the pedestrian or obstruction and understand the reason why the lead vehicle is stopped, thus easing driver impatience and potentially preventing an unsafe driver reaction.

After any unexpected lead vehicle stop—any lead vehicle stop that is unexpected may be a situation where see-through functionality may be useful. For example, after the following vehicle has safely stopped, a see-through view may be presented to help the driver of the following vehicle see what is ahead of the lead vehicle and understand the reason for the stop.

Automated vehicle platooning—the following vehicle is part of an automated vehicle platoon. Vehicles in the platoon may be following one another at a very close distance. See-through functionality may allow a driver of a following vehicle to see through preceding vehicles to the front of the platoon.

The various relevant vehicle maneuvers may be detected by the following vehicle using equipment such as an ECU and sensors such as cameras, LIDAR, and/or RADAR. Computer vision/machine learning techniques may also be employed. In another embodiment, the vehicle may receive an input from the driver about his/her intention to perform a maneuver (e.g., overtaking etc.). As a result of step 608, if none of the relevant vehicle maneuvers are detected, the process 600 proceeds to step 614 to automatically disable see-through functionality. Otherwise, the process 600 proceeds to a subsequent check step.

At a step 610, a check is performed to determine whether an object may have come between the lead vehicle and the following vehicle. Such an object can potentially be masked by the see-through functionality and thus create a dangerous condition, as illustrated and discussed previously with respect to FIG. 5 (as well as discussed with respect to FIGS. 8A-8D). See-through functionality might misrepresent reality in such a situation, by "disappearing" the object, e.g., a pedestrian, that is positioned between the lead vehicle and the following vehicle. Thus, the following vehicle may monitor the space between the lead vehicle and the following vehicle, e.g., by using sensors such as camera(s), LIDAR, and/or RADAR detectors. If an object is detected or new object has moved into the space between the vehicles, the process proceeds to step 614 to automatically disable see-through functionality to improve safety. Otherwise, the process 600 proceeds to a subsequent check step.

At a step 612, a check is performed to determine if the lead vehicle is braking. As discussed previously with respect to FIG. 5, see-through functionality may also "disappear" the lead vehicle, in order to provide a view of the scene ahead of the lead vehicle. However, doing so may be unsafe if the lead vehicle is breaking. In such a scenario, the driver of the following vehicle needs to be alerted to the fact that the lead vehicle is braking. "Disappearing" the lead vehicle may be unsafe. Relying on the see-through mixed-reality image (e.g., FIG. 5), the driver of the following vehicle may be deprived of visual cues indicating that the lead vehicle is breaking, such as braking lights of the lead vehicle being activated or the image of the leading vehicle quickly becoming closer in proximity. Thus, if the lead vehicle is braking, it may be safer to disable see-through functionality. According to various embodiments, there may be different ways of determining whether the lead vehicle is braking rapidly, which may be used individually or in combination:

Lead vehicle V2V speed data—As mentioned previously, the lead vehicle may broadcast its status information such as current speed, acceleration, and a braking flag. This may be done over a V2V communication link, for example. The following vehicle may receive such status information and use it to determine whether lead vehicle braking has exceeded a threshold value, e.g., a deceleration threshold.

Following vehicle forward sensor data—Using forward sensor(s), the following vehicle may monitor the lead vehicle's speed, distance, and acceleration. Such information can be used to determine whether lead vehicle braking has exceeded a threshold value.

Video-based brake light or looming distance measurement—Camera(s) aboard the following vehicle may be used to capture images which can be processed using computer vision/machine learning techniques to watch for signs of lead vehicle breaking, such as break light activation or objects quickly approaching or looming. Such visually-based techniques can also be used to determine whether lead vehicle braking has exceeded a threshold value.

As a result of step 612, if it is determined that the lead vehicle is breaking, the process proceeds to step 614 to automatically disable see-through functionality. Otherwise, the process 600 proceeds to step 616 to automatically enable see-through functionality.

While not explicitly shown in FIG. 6, the process 600 may be operated in a loop to repeatedly check for the listed conditions to automatically enable or disable see-through functionality. For example, upon existing step 614, the process 600 may return to step 602 to repeat the various steps for checking conditions. Similarly, upon existing step 616, the process 600 may return to step 602 to repeat the various steps for checking conditions. The process 600 may be repeatedly performed in a loop in this manner. The steps described above in process 600 may be performed by equipment aboard the following vehicle, according to at least one embodiment. For example, steps 602 through steps 616 may be performed by an ECU, e.g., a video ECU and/or a telematics and GPS ECU, aboard the following vehicle.

The terms "enabling" and "disabling" are used here in a broad sense. For example, disabling see-through functionality may involve discontinuing the merger of images captured by the lead vehicle and the following vehicle, to present only images captured by the following vehicle. Alternatively, disabling see-through functionality may involve diminishing the mixed-reality content of the images presented. A presented image may still be merged, just with less emphasis on the contribution by the image captured by the lead vehicle. For example, a portion of image from the camera of the lead vehicle may be de-emphasized, and a portion of image from the camera of the following vehicle may be emphasized, and the two image portions may be blended to create the merged image. Presentation of such merged image(s) may constitute "disabling" see-through functionality, because the view in front of the lead vehicle has been de-emphasized. Similarly, enabling see-through functionality may involve presenting merged images in which a portion of view as seen by the following vehicle is completely replaced with a portion of view as seen by the lead vehicle. Alternatively, enabling see-through functionality may involve amplifying the mixed-reality content of the images presented to emphasize the contribution of the image captured by the lead vehicle. For example, a portion of image from the camera of the lead vehicle may be emphasized, and a portion of image from the camera of the following vehicle may be de-emphasized, and the two image portions may be blended to create the merged image. Presentation of such merged image(s) may constitute "enabling" see-through functionality, because the view in front of the lead vehicle has been emphasized.

Figure 7A:
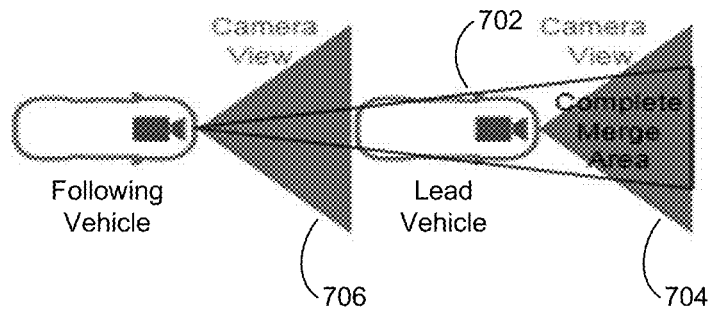
FIGS. 7A, 7B, and 7C illustrate various scenarios of good and bad camera alignment for supporting see-through functionality, according certain embodiments.
Figure 7B:
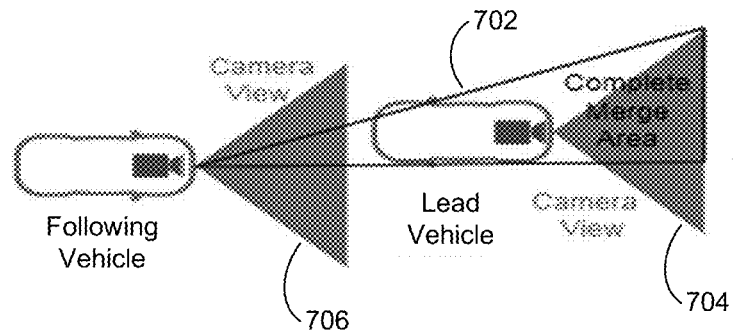
Figure 7C:
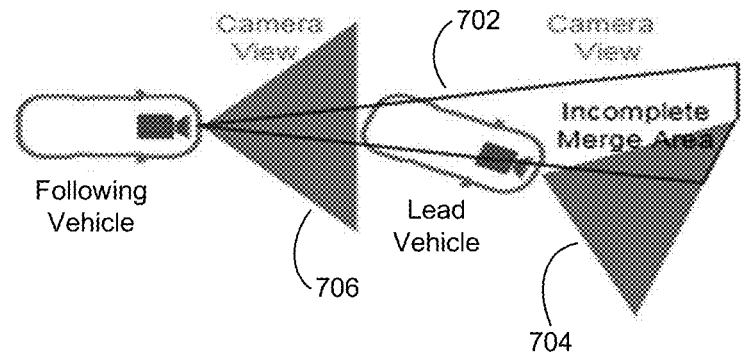

FIGS. 7A, 7B, and 7C illustrate various scenarios of good and bad camera alignment for supporting see-through functionality, according certain embodiments. As discussed previously, proper alignment of the camera(s) aboard the lead vehicle and the camera(s) aboard the following vehicle may be a condition that is used in enabling or disabling see-through functionality. Proper alignment may not necessarily require the cameras to point in exactly the same direction. Rather, being in alignment may refer to the cameras being within a tolerable range of relative orientations in view of their position, angle, and field of view. According to at least one embodiment, proper camera alignment may be achieved when, from the perspective of the following vehicle, the angular field of occlusion defined by the presence of the lead vehicle is completely overlapped by the angular field of view of the camera of the lead vehicle. Such a condition allows for a complete merge area to be formed in the merged image. Further explanation by way of example is provided below.

FIG. 7A shows an example of good camera alignment, according to one embodiment. From the perspective of the following vehicle, the angular field of occlusion 702 is defined as the angle range that is occluded by the lead vehicle. The angular field of view 704 of the camera aboard the lead vehicle and the angular field of view 706 of the camera aboard the following vehicle are also shown. Here, the angular field of occlusion 702 is completely overlapped by the angular field of view 704 of the camera of the lead vehicle. Thus, a mixed-reality image can be constructed with a complete merged area. In other words, an occluded portion of the image captured by the camera of the following vehicle may be completely overlapped (and potentially replaced) by an unoccluded portion of the image captured by the camera of the lead vehicle. Proper camera alignment is thus achieved to support see-through functionality, according to the present embodiment.

FIG. 7B shows another example of good camera alignment, according to one embodiment. Here, unlike in FIG. 7A, the lead vehicle is not directly in front of the following vehicle. Instead, the lead vehicle is slightly offset with respect to the following vehicle. Nevertheless, despite this offset position, the angular field of occlusion 702 is completely overlapped by the angular field of view 704 of the camera of the lead vehicle. A mixed-reality image can be constructed with a complete merged area. Thus, proper camera alignment is achieved to support see-through functionality, according to the present embodiment.

FIG. 7B shows an example of bad camera alignment, according to one embodiment. Here, the lead vehicle has executed a significant turning maneuver, such that the angular field of occlusion 702 is no longer completely overlapped by the angular field of view 704 of the camera of the lead vehicle. If a mixed-reality image were to be constructed, it would have an incomplete merge area. In other words, an occluded portion of the image captured by the camera of the following vehicle may not be completely overlapped (and thus cannot be completely replaced) by an unoccluded portion of the image captured by the camera of the lead vehicle. The camera alignment is thus unable to support see-through functionality according to the present embodiment.

Figure 8A:
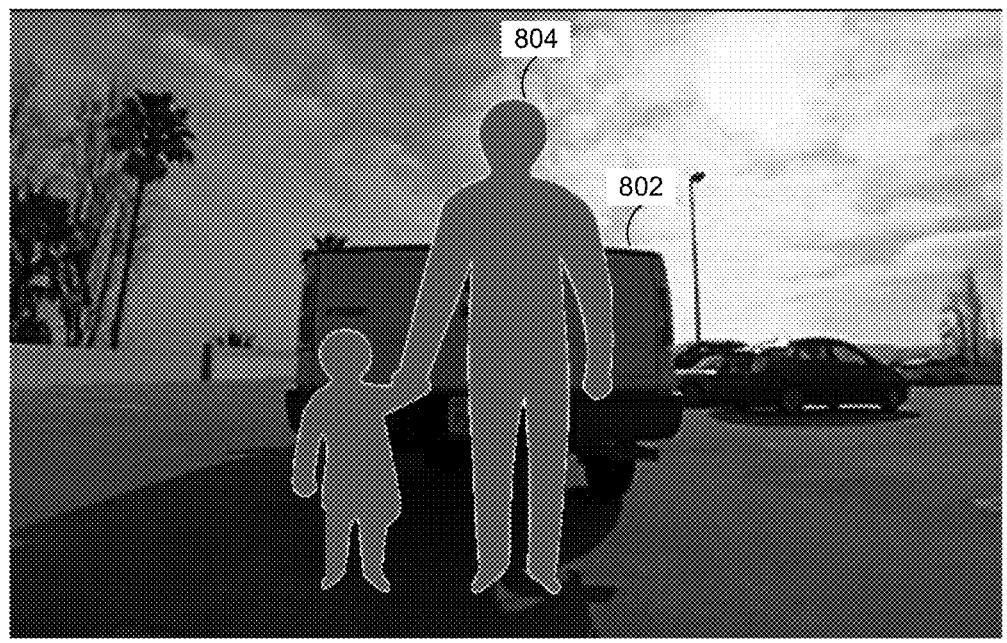
FIGS. 8A, 8B, 8C, and 8D illustrate the presentation of object(s) located between a lead vehicle and a following vehicle, to make such object(s) visible in a mixed-reality view that sees through the lead vehicle, according to embodiments of the disclosure.

FIGS. 8A, 8B, 8C, and 8D illustrate the presentation of object(s) located between a lead vehicle and a following vehicle, to make such object(s) visible in a mixed-reality view that sees through the lead vehicle, according to embodiments of the disclosure. FIG. 8A shows an image of a real-world road scene before any mixed-reality view is presented. The image may be captured by a camera aboard the following vehicle. In FIG. 8A, a lead vehicle 802 is shown. In addition, object(s) 804 positioned between the lead vehicle 802 and the following vehicle are also shown. For example, object(s) 804 may be pedestrians, such an adult and a child who have walked between the lead vehicle 802 and the following vehicle. In FIG. 8A, object(s) 804 are shown as representations, e.g., as solid-colored shapes. Alternatively, object(s) 804 may also be shown as the actual images of object(s) 804. That is, the images of object(s) 802 may show visual details of object(s) 804 as captured by the camera aboard the following vehicle.

Figure 8B:
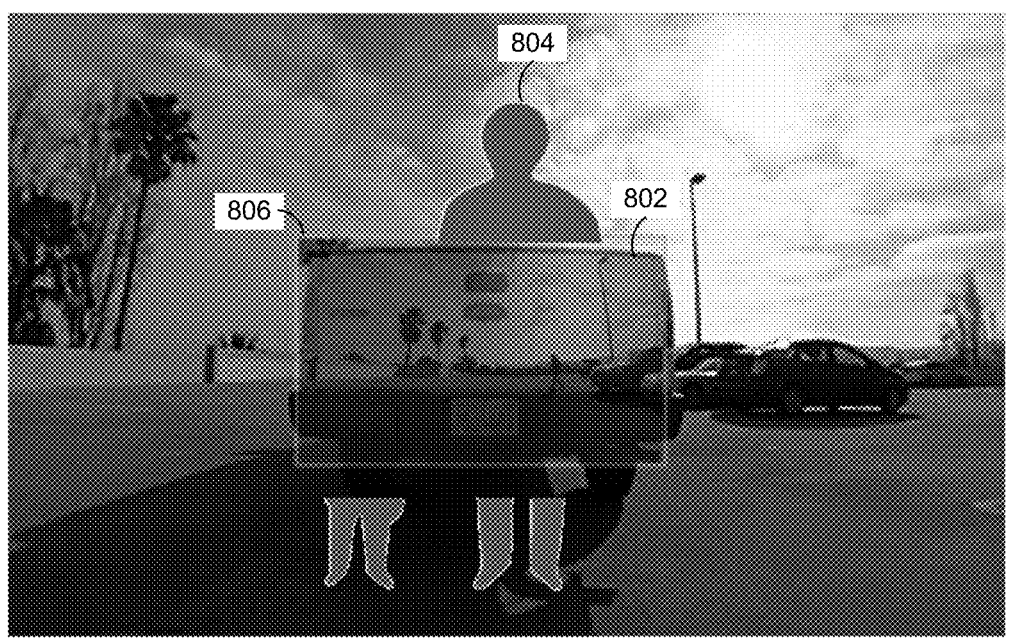

FIG. 8B shows a mixed-reality image that may obscure a view of object(s) 804 positioned between the lead vehicle 802 and the following vehicle, where the mixed-reality image is based on the image of the real-world show in FIG. 8A. Here, the mixed-reality image is intended to provide "see-through" functionality, to allow the driver of the following vehicle to see through the lead vehicle 802. As discussed previously, this can be achieved by merging an image captured by the following vehicle with an image captured by the lead vehicle 802. More specifically, an occluded portion of the image captured by the camera aboard the following vehicle is merged with an unoccluded portion of the image captured by the camera aboard the lead vehicle 802. In one embodiment, this is achieved using a first bounding box 806. Within the bounding box 806, a portion of the image captured by the lead vehicle is shown, revealing the scene in front of lead vehicle 802 that otherwise would have been occluded, by the lead vehicle 802, from the view of the following vehicle. Outside the bounding box 806, a portion of the image captured by the following vehicle is shown.

While the resulting mixed-reality image shown in FIG. 8B does provide see-through functionality, object(s) 804 can be "disappeared," which can create an unsafe condition. As shown in FIG. 8B, the mixed-reality image has partially "disappeared" object(s) 804. However, depending on the size of the bounding box 806 and the size of the object(s) 804 as they appear in the image, it is possible for the mixed-reality image to completely "disappear" object(s) 804. This "disappearing" effect may be unsafe, because the driver of the following vehicle may rely on the mixed-reality image being presented and falsely assume that object(s) 804 do not exist, i.e., there is nothing between the following vehicle and the lead vehicle 802. Consequently, the driver of the following vehicle may fail to keep a safe distance and possibly even allow the following vehicle to strike object(s) 804 (e.g., pedestrians positioned between the lead vehicle 802 and the following vehicle).

Figure 8C:
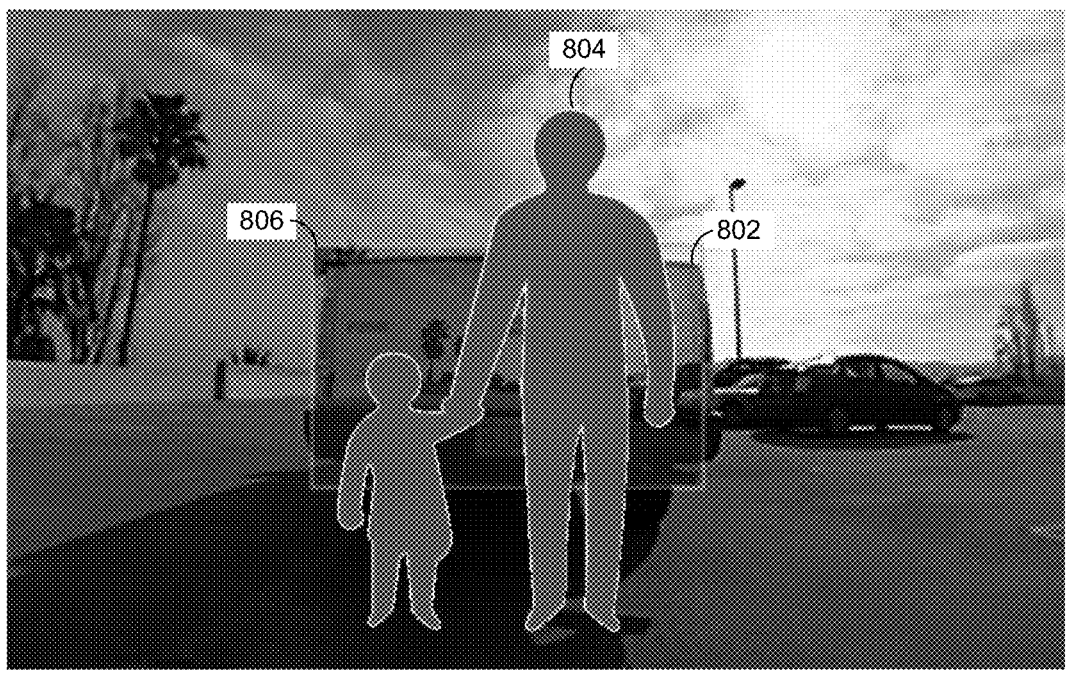

FIG. 8C shows a mixed-reality image that provides "see-through" functionality, as well as a representation of object(s) 804 positioned between the following vehicle and the lead vehicle 802. As discussed previously, the merged-image includes a first bounding box 806 in which an unoccluded portion of the image captured by the lead vehicle 802 is presented, thus providing the ability to see through the lead vehicle 802. In addition, object(s) 804 are also detected and a representation of them presented. Detection of object(s) 804 may be implemented in various ways. As mentioned previously, the following vehicle may be equipped with various sensor such as LIDAR and RADAR sensors (e.g., LIDAR and RADAR sensors 226 in FIG. 2), as well as camera(s) (e.g., cameras 224 in FIG. 2). Such sensors and cameras may be used to detect the presence of object(s) 804 positioned between the following vehicle and the lead vehicle 802. Computing resources aboard the following vehicle (e.g., Video ECU 230 in FIG. 2, processing units 910 in FIG. 9, discussed later, etc.) may be utilized to process sensor and image information to detect object(s) 804. In various embodiments, object detection is performed using sensor data, image data, and/or a combination of sensor and image data.

A representation of object(s) 804 is then presented in the mixed-reality image. This may be accomplished by defining a region in the merged image that contains the object(s) 804 between the following vehicle and the lead vehicle 802. In the defined region, a representation of object(s) 804 is presented instead of the occluded portion of image captured by the lead vehicle 802. In the embodiment shown in FIG. 8C, the defined region follows the contours of object(s) 804. Also, in this embodiment, a solid-color shape that follows the contours of object(s) 804 is use as the representation of object(s) 804. However, as mentioned previously, an actual image of object(s) 804 may also be used as the representation.

In one implementation, the logic for triggering presentation of a representation of object(s) 804 may be as follows. Upon detection of object(s) 804 between the following vehicle and the lead vehicle 802, the defined region containing object(s) 804 is compared with the first bounding box 806. If there is overlap between the defined region and the first bounding box 806, then see-through functionality is switched off for the overlapping area. The process may also be envisioned as simply changing the shape of the see-through window, to avoid the defined region containing object(s) 804. In other words, the shape of the see-through window, in which the view of the lead vehicle 802 is presented, may be defined as the portion of the first bounding box 806 that does not include the defined region containing object(s) 804. Thus, the mixed-reality image provides both (1) see-through functionality, e.g., the first bounding box 806 which presents a view of the scene in front of the lead vehicle 802 and (2) a representation of objects(s) 804 positioned between the following vehicle and the lead vehicle 802.

Figure 8D:
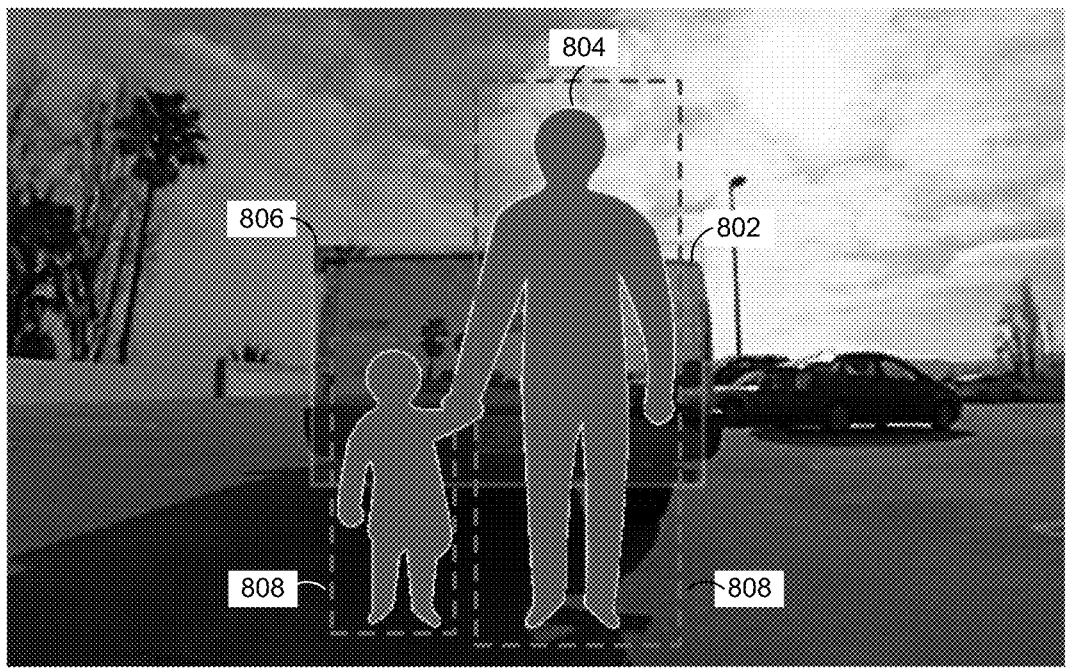

FIG. 8D also shows a mixed-reality image that provides both "see-through" functionality as well as a representation of object(s) 804 positioned between the following vehicle and the lead vehicle 802, but with a simpler implementation. Again, a region is defined that contains the object(s) 804 between the following vehicle and the lead vehicle 802. However, in this case, the defined region does not follow the contours of object(s) 804. Instead, the defined region is implemented as one or more secondary bounding boxes 808, which are easier to implement. In the specific embodiment shown in FIG. 8D, each of the secondary bounding boxes 808 has a rectangular shape. A representation of object(s) 804 is presented within the secondary bounding boxes 808. Thus, a see-through window may be shaped as: the first bounding window 806 minus the secondary bounding windows 808. According to at least one embodiment, within this see-through window, the merged image presents a portion of the image captured by the lead vehicle 802. Outside this see-through window, the merged image presents a portion of the image captured by the following vehicle.

Figure 9:
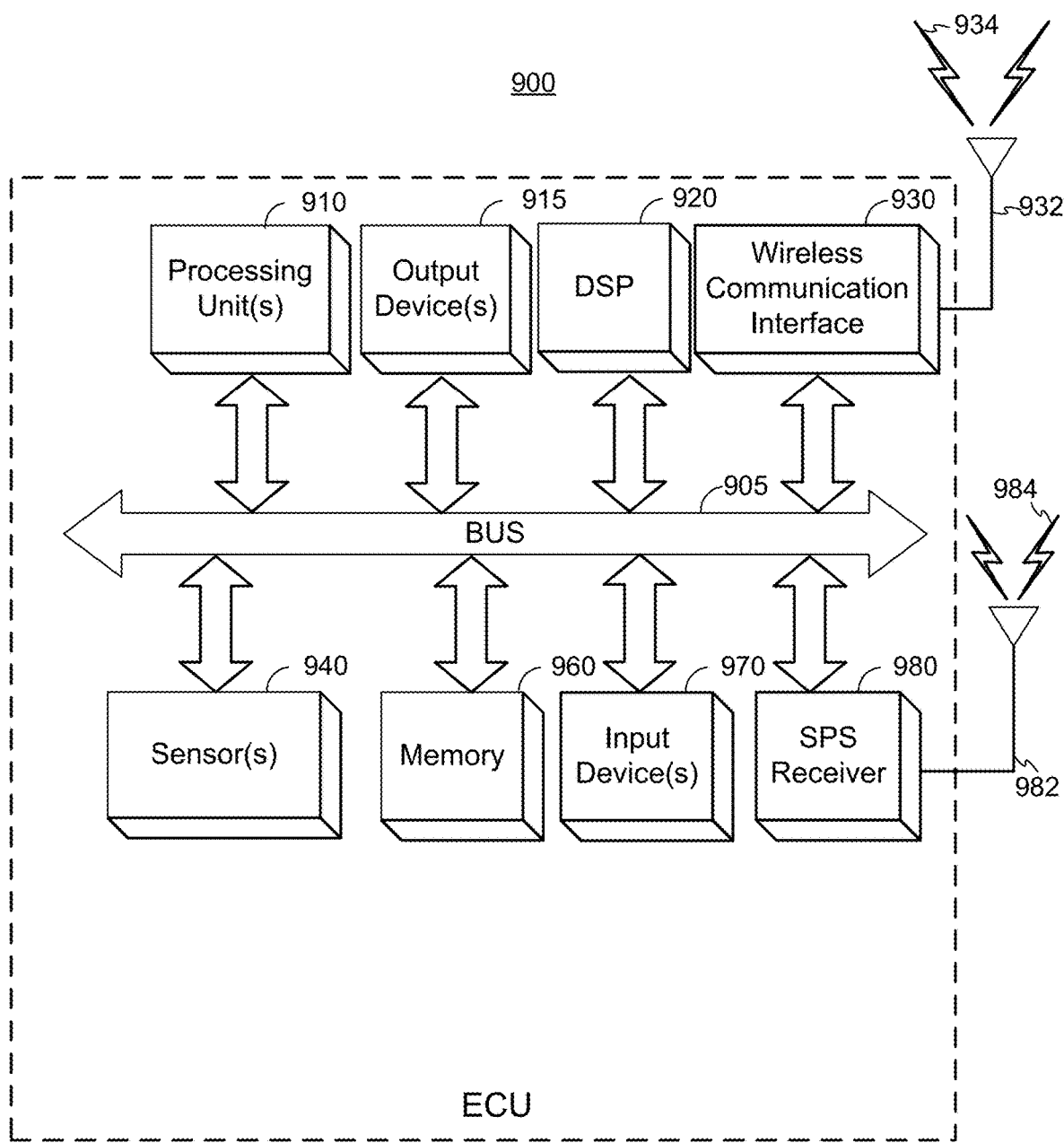
FIG. 9 is a block diagram of internal components of an example of an electronic control unit (ECU) that may be implemented according to an embodiment.

FIG. 9 is a block diagram of internal components of an example of an electronic control unit (ECU) that may be implemented according to an embodiment. For instance, ECU 900 may represent an implementation of a telematics and GPS ECU or a video ECU, discussed previously. It should be noted that FIG. 9 is meant only to provide a generalized illustration of various components, any or all of which may be utilized as appropriate. It can be noted that, in some instances, components illustrated by FIG. 9 can be localized to a single physical device and/or distributed among various networked devices, which may be disposed at different physical locations.

The ECU 900 is shown comprising hardware elements that can be electrically coupled via a bus 905 (or may otherwise be in communication, as appropriate). The hardware elements may include a processing unit(s) 910 which can include without limitation one or more general-purpose processors, one or more special-purpose processors (such as digital signal processing (DSP) chips, graphics acceleration processors, application specific integrated circuits (ASICs), and/or the like), and/or other processing structure or means. As shown in FIG. 8, some embodiments may have a separate DSP 920, depending on desired functionality. The device 900 also can include one or more input device controllers 970, which can control without limitation an in-vehicle touch screen, a touch pad, microphone, button(s), dial(s), switch(es), and/or the like; and one or more output device controllers 915, which can control without limitation a display, light emitting diode (LED), speakers, and/or the like.

The ECU 900 might also include a wireless communication interface 930, which can include without limitation a modem, a network card, an infrared communication device, a wireless communication device, and/or a chipset (such as a Bluetooth device, an IEEE 802.11 device, an IEEE 802.16.4 device, a WiFi device, a WiMax device, cellular communication facilities including 4G, 5G, etc.), and/or the like. The wireless communication interface 930 may permit data to be exchanged with a network, wireless access points, other computer systems, and/or any other electronic devices described herein. The communication can be carried out via one or more wireless communication antenna(s) 932 that send and/or receive wireless signals 934.

Depending on desired functionality, the wireless communication interface 930 can include separate transceivers to communicate with base transceiver stations (e.g., base stations of a cellular network) and/or access point(s). These different data networks can include various network types. Additionally, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on, including 4G and 5G technologies.

The ECU 900 can further include sensor controller(s) 940. Such controllers can control, without limitation, one or more accelerometer(s), gyroscope(s), camera(s), magnetometer(s), altimeter(s), microphone(s), proximity sensor(s), light sensor(s), and the like.

Embodiments of the ECU 900 may also include a Satellite Positioning System (SPS) receiver 980 capable of receiving signals 984 from one or more SPS satellites using an SPS antenna 982. The SPS receiver 980 can extract a position of the device, using conventional techniques, from satellites of an SPS system, such as a global navigation satellite system (GNSS) (e.g., Global Positioning System (GPS)), Galileo, Glonass, Compass, Quasi-Zenith Satellite System (QZSS) over Japan, Indian Regional Navigational Satellite System (IRNSS) over India, Beidou over China, and/or the like. Moreover, the SPS receiver 1780 can be used various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The ECU 900 may further include and/or be in communication with a memory 960. The memory 960 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 960 of the device 900 also can comprise software elements (not shown), including an operating system, device drivers, executable libraries, and/or other code embedded in a computer-readable medium, such as one or more application programs, which may comprise computer programs provided by various embodiments, and/or may be designed to implement methods, and/or configure systems, provided by other embodiments, as described herein. In an aspect, then, such code and/or instructions can be used to configure and/or adapt a general purpose computer (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A method for providing a mixed-reality scene involving a lead vehicle and a following vehicle comprising:
   presenting a sequence of mixed-reality images to a driver of the following vehicle, wherein at least one image in the sequence of mixed-reality images results from merging (a) an image captured by a camera aboard the lead vehicle and (b) an image captured by a camera aboard the following vehicle, to generate a merged image;

wherein the merging comprises de-emphasizing an occluded portion of the image captured by the camera aboard the following vehicle, the occluded portion corresponding to occlusion by the lead vehicle, and emphasizing an unoccluded portion of the image captured by the camera aboard the lead vehicle;

in response to one or more detected conditions, discontinuing or diminishing mixed-reality content of the sequence of mixed-reality images presented to the driver of the following vehicle, wherein the one or more detected conditions comprise:

detection of an object between the lead vehicle and the following vehicle, wherein in the merged image, a view of the object is at least partially masked as result of de-emphasizing the occluded portion of the image captured by the camera aboard the following vehicle and emphasizing the unoccluded portion of the image captured by the camera aboard the lead vehicle.

2. The method of claim 1, wherein the de-emphasizing of the occluded portion of the image captured by the camera aboard the following vehicle and the emphasizing of the unoccluded portion of the image captured by the lead vehicle comprise:

blending the image captured by the camera aboard the following vehicle and the image captured by the camera aboard the lead vehicle.

3. The method of claim 1, wherein the de-emphasizing of the occluded portion of the image captured by the camera aboard the following vehicle and the emphasizing of the unoccluded portion of the image captured by the lead vehicle comprise:

replacing the occluded portion of the image captured by the camera aboard the following vehicle with the unoccluded portion of the image captured by the lead vehicle.

4. The method of claim 1, wherein the diminishing of the mixed-reality content of the sequence of mixed-reality images comprises emphasizing the occluded portion of the image captured by the camera aboard the following vehicle and de-emphasizing the unoccluded portion of the image captured by the camera aboard the lead vehicle.

5. The method of claim 1, wherein the one or more detected conditions further comprise detection of a braking condition associated with the lead vehicle.

6. The method of claim 1,
wherein the one or more detected conditions further comprise detection of at least one relevant maneuver performed by the following vehicle,
wherein the at least one relevant maneuver is selected from an over-taking maneuver, a right turn, a mid-block pedestrian crossing event, or an unexpected lead vehicle stop.

7. The method of claim 1, wherein the one or more detected conditions further comprise detection of improper camera alignment associated with the camera aboard the lead vehicle and the camera aboard the following vehicle.

8. The method of claim 1, wherein the one or more detected conditions further comprise determination that a candidate lead vehicle is not positioned in front of the following vehicle.

9. The method of claim 1, wherein discontinuing or diminishing mixed-reality content of the sequence of mixed-reality images comprises:

in the merged image, presenting a representation of the object between the lead vehicle and the following vehicle.

10. The method of claim 9, wherein the representation of the object between the lead vehicle and the following vehicle is presented by:

defining a region in the merged image containing the object between the lead vehicle and the following vehicle; and in the defined region, presenting the representation of the object between the lead vehicle and the following vehicle instead of the unoccluded portion of the image captured by the lead vehicle.

11. An apparatus for providing a mixed-reality scene involving a lead vehicle and a following vehicle comprising:
an electronic control unit (ECU); and
a display,
wherein the ECU is configured to:
generate a sequence of mixed-reality images for presentation to a driver of the following vehicle, wherein the ECU is configured to generate at least one image in the sequence of mixed-reality images results by merging (a) an image captured by a camera aboard the lead vehicle and (b) an image captured by a camera aboard the following vehicle, to generate a merged image;

wherein the merging comprises de-emphasizing an occluded portion of the image captured by the camera aboard the following vehicle, the occluded portion corresponding to occlusion by the lead vehicle, and emphasizing an unoccluded portion of the image captured by the camera aboard the lead vehicle;

in response to one or more detected conditions, discontinue or diminish mixed-reality content of the sequence of mixed-reality images presented to the driver of the following vehicle, wherein the one or more detected conditions comprise:

detection of an object between the lead vehicle and the following vehicle, wherein in the merged image, a view of the object is at least partially masked as result of de-emphasizing the occluded portion of the image captured by the camera aboard the following vehicle and emphasizing the unoccluded portion of the image captured by the camera aboard the lead vehicle, and wherein the display is configured to present the sequence of mixed-reality images to the driver of the following vehicle.

12. The apparatus of claim 11, wherein the ECU is configured to de-emphasize the occluded portion of the image captured by the camera aboard the following vehicle and emphasize the unoccluded portion of the image captured by the lead vehicle by:

blending the image captured by the camera aboard the following vehicle and the image captured by the camera aboard the lead vehicle.

13. The apparatus of claim 11, wherein the ECU is configured to de-emphasize the occluded portion of the image captured by the camera aboard the following vehicle and the emphasize the unoccluded portion of the image captured by the lead vehicle by:

replacing the occluded portion of the image captured by the camera aboard the following vehicle with the unoccluded portion of the image captured by the lead vehicle.

14. The apparatus of claim 11, wherein the ECU is configured to diminish the mixed-reality content of the sequence of mixed-reality images by emphasizing the occluded portion of the image captured by the camera aboard the following vehicle and de-emphasizing the unoccluded portion of the image captured by the camera aboard the lead vehicle.

15. The apparatus of claim 11, wherein the one or more detected conditions further comprise detection of a braking condition associated with the lead vehicle.

16. The apparatus of claim 11, wherein the one or more detected conditions further comprise detection of at least one relevant maneuver performed by the following vehicle.

17. The apparatus of claim 11, wherein the one or more detected conditions further comprise detection of improper camera alignment associated with the camera aboard the lead vehicle and the camera aboard the following vehicle.

18. The apparatus of claim 11, wherein the ECU is configured to discontinue or diminish mixed-reality content of the sequence of mixed-reality images by:
in the merged image, presenting a representation of the object between the lead vehicle and the following vehicle.

19. The apparatus of claim 18, wherein the representation of the object between the lead vehicle and the following vehicle is presented by:
defining a region in the merged image containing the object between the lead vehicle and the following vehicle; and
in the defined region, presenting the representation of the object between the lead vehicle and the following vehicle instead of the unoccluded portion of image captured by the lead vehicle.

20. A computer-readable storage medium containing instructions that, when executed by one or more processors of a computer, cause the one or more processors to:
cause a sequence of mixed-reality images to be presented to a driver of a following vehicle, wherein at least one image in the sequence of mixed-reality images results from merging (a) an image captured by a camera aboard a lead vehicle and (b) an image captured by a camera aboard the following vehicle, to generate a merged image;
wherein the merging comprises de-emphasizing an occluded portion of the image captured by the camera aboard the following vehicle, the occluded portion corresponding to occlusion by the lead vehicle, and emphasizing an unoccluded portion of the image captured by the camera aboard the lead vehicle;
in response to one or more detected conditions, discontinue or diminish mixed-reality content of the sequence of mixed-reality images presented to the driver of the following vehicle, wherein the one or more detected conditions comprise:
detection of an object between the lead vehicle and the following vehicle, wherein in the merged image, a view of the object is at least partially masked as result of de-emphasizing the occluded portion of the image captured by the camera aboard the following vehicle and emphasizing the unoccluded portion of the image captured by the camera aboard the lead vehicle.

* * * * *